(12) United States Patent
Varfolomeyev et al.

(10) Patent No.: US 11,323,545 B1
(45) Date of Patent: May 3, 2022

(54) RESILIENT AND DATA-ORIENTED APPROACH FOR APPLICATION DATA PROCESSING

(71) Applicant: MICROSOFT TECHNOLOGY LICENSING, LLC, Redmond, WA (US)

(72) Inventors: Vadim Valeryevich Varfolomeyev, Redmond, WA (US); Robertjan Tuit, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/307,120

(22) Filed: May 4, 2021

(51) Int. Cl.
| | |
|---|---|
| *H04L 29/08* | (2006.01) |
| *H04L 67/133* | (2022.01) |
| *H04L 67/51* | (2022.01) |
| *H04L 67/142* | (2022.01) |
| *G06F 8/35* | (2018.01) |
| *G06F 8/10* | (2018.01) |
| *G06F 9/48* | (2006.01) |

(52) U.S. Cl.
CPC ............ *H04L 67/40* (2013.01); *G06F 8/10* (2013.01); *G06F 8/35* (2013.01); *G06F 9/4881* (2013.01); *H04L 67/142* (2013.01); *H04L 67/16* (2013.01)

(58) Field of Classification Search
CPC ....... H04L 67/40; H04L 67/142; H04L 67/16; G06F 8/10; G06F 8/35; G06F 9/4881
See application file for complete search history.

(56) References Cited

U.S. PATENT DOCUMENTS

| | | | |
|---|---|---|---|
| 6,092,062 A * | 7/2000 | Lohman | ............ G06F 16/24542 |
| 6,728,758 B2 | 4/2004 | Sato | |
| 7,761,406 B2 | 7/2010 | Harken | |
| 8,150,882 B2 | 4/2012 | Meek et al. | |
| 8,713,036 B2 | 4/2014 | Dettinger et al. | |
| 8,886,632 B2 | 11/2014 | Dettinger et al. | |
| 9,875,121 B2 | 1/2018 | Roth et al. | |
| 10,091,086 B2 | 10/2018 | Prabhakar et al. | |
| 10,148,493 B1 | 12/2018 | Ennis et al. | |
| 10,275,851 B1 * | 4/2019 | Zhao | ..................... G06F 9/5044 |

(Continued)

FOREIGN PATENT DOCUMENTS

EP    1381979 A4    1/2005

OTHER PUBLICATIONS

"API Manager custom policies", Retrieved from: https://docs.axway.com/bundle/APIManager_762_APIMgmtGuide_allOS_en_HTML5/page/Content/APIManagementGuideTopics/api_mgmt_custom_policies.htm. Retrieved Date: Jan. 22, 2021, 9 Pages.

(Continued)

*Primary Examiner* — Aftab N. Khan
(74) *Attorney, Agent, or Firm* — NovoTechIP International PLLC

(57) ABSTRACT

An efficient data processing solution presented herein provides a strongly typed parametrized API. The data processing solution is capable of creating an API on demand, which significantly reduces memory usage and bundle sizes, e.g., as compared to lazy-loading approaches. The data processing solution includes integrated request logic that is based on formal specifications rather than on implementation, thereby increasing flexibility and better adapting to the service needs. The data processing solution also supports a middleware layer that helps to isolate concerns of various components and to result in small functional blocks with better maintainability and resiliency.

20 Claims, 8 Drawing Sheets

(56) References Cited

U.S. PATENT DOCUMENTS

| | | | |
|---|---|---|---|
| 2005/0022157 A1* | 1/2005 | Brendle | G06Q 10/10 |
| | | | 717/104 |
| 2005/0155016 A1* | 7/2005 | Bender | G06F 8/35 |
| | | | 717/106 |
| 2010/0057760 A1 | 3/2010 | Demant et al. | |
| 2011/0131318 A1* | 6/2011 | Maes | G06F 11/1482 |
| | | | 709/224 |
| 2014/0075016 A1* | 3/2014 | Chatterjee | H04L 47/70 |
| | | | 709/224 |
| 2015/0019735 A1* | 1/2015 | Pogrebinsky | G06F 16/958 |
| | | | 709/226 |
| 2015/0213259 A1* | 7/2015 | Du | H04L 63/1408 |
| | | | 726/27 |
| 2016/0294667 A1* | 10/2016 | Prabhakar | H04L 67/2804 |
| 2021/0136158 A1* | 5/2021 | Finkelstein | H04L 47/788 |
| 2021/0303369 A1* | 9/2021 | Hamze | G06F 9/4806 |

OTHER PUBLICATIONS

"Axios", Retrieved from: https://web.archive.org/web/20171013040304/https://github.com/axios/axios, Oct. 13, 2017, 11 Pages.

Gaitonde, et al., "Using API Gateway as a Single Entry Point for Web Applications and API Microservices", Retrieved from: https://aws.amazon.com/blogs/architecture/using-api-gateway-as-a-single-entry-point-for-web-applications-and-api-microservices/, Oct. 22, 2019, 7 Pages.

Hans, Thorsten, "Exposing APIS Using Azure API Management", Retrieved From: https://www.thinktecture.com/en/azure/exposing-apis-using-azure-api-management/, Sep. 16, 2020, 16 Pages.

Ibryam, Bilgin, "Data Gateways in the Cloud Native Era", Retrieved from: https://www.infoq.com/articles/data-gateways-cloud-native/, May 7, 2020, 11 Pages.

Lawson, Joan, "Data Services in SOA: Maximizing the Benefits in Enterprise Architecture", Retrieved from: https://www.oracle.com/technical-resources/articles/middleware/soa-j-lawson-soa-data.html, Apr. 2009, 11 Pages.

Montin, Magnus, "Implementing a generic data access layer using Entity Framework", Retrieved from: https://blog.magnusmontin.net/2013/05/30/generic-dal-using-entity-framework/, May 30, 2013, 19 Pages.

* cited by examiner

RESILIENT AND DATA-ORIENTED APPROACH FOR APPLICATION DATA PROCESSING

BACKGROUND

A client device may communicate with a server to perform various tasks. For example, the client device may perform a fundamental task of retrieving data from the server. However, existing data processing approaches may not appropriately perform these tasks due to defects in functional logic such as retries, redirects or long polling, telemetry and logging of ongoing requests, maintainability of API, and other factors related to performance of the tasks. Some existing approaches may allow a client device to retrieve data using a fixed set of functions, but this requires a significant amount of memory and bundle sizes. Some existing approaches may use lazy loading to reduce the impact on the memory and bundle sizes, which, however, affects loading time. Also, lazy loading needs expensive error boundaries and retry mechanisms, thereby causing growing complexity and reduced resiliency over networking. Other existing approaches such as outlook web access (OWA) are applicable only when certain communications between the server and the client occur. OWA also does not offer functional logic such as redirecting, retrying, etc. Although a promise-based HTTP client such as Axios, unlike OWA, offers a scalable solution to implement and inject custom functional logic over network requests, Axios does not support strongly typed application programming interfaces (APIs) or offload the service-side burden in the data processing. Moreover, in Axios, the extensibility for request logic may be uncontrollable and thus may cause conflicts and run-time issues.

Hence, there is a need for an efficient data processing solution that at least offers strongly typed parametrized APIs, creates APIs on demand to reduce the requirement for memory and bundle sizes, and supports small functional blocks to improve maintainability and resiliency.

SUMMARY

In one aspect, a system for facilitating data processing based on dynamically-created application programming interfaces (APIs) includes a processor, and a memory, coupled to the processor, storing executable instructions. The instructions, when executed by the processor, cause the system to: create a data manager associated with an application based on application context, the data manager defining execution logic that manages a data processing flow, the application context providing configuration information of the application; retrieve a first set of models corresponding to a first service; dynamically create, by the data manager during a run-time of the application, a first API corresponding to the first service, the first API including a first set of callable methods based on rules specified in the first set of models; receive, from the first service, a first request to perform a specific task by calling the created first API; and execute the first request to perform the specific task by executing a method selected from among the first set of callable methods in the first API, wherein executing the method in the first API includes: resolving, by using the first set of models, information needed for executing the method based on the first request, executing, by the data manager in communication with the first set of models, the method using the resolved information, and returning, by the data manager, a result of performing the specific task to the first service.

The above general aspect may include one or more of the following features: retrieve a second set of models corresponding to a second service, and dynamically create, by the data manager during the run-time of the application, a second API corresponding to the second service, the second API including a second set of callable methods based on rules specified in the second set of models, wherein the second API corresponding to the second service is different from the first API corresponding to the first service; transform, by using the first set of models, an initial specification to a final specification based on the resolved information, and execute, by the data manager in communication with the first set of models, the method based on the final specification; transmit one or more parameters associated with the first request from the first service to the set of models, identify a contractor service outside of the application from the application context, and determine the information needed to create the final specification using the contractor service based on the one or more parameters and the initial specification; share the first API with other services; receive a second request from the first service of the application to create the first API and create, by the data manager, the first API in response to receiving the second request; track execution of APIs and provide network health states by the data manager; and pass the application context from the data manager to a data model set, and create the first set of models by the data model set using the application context.

These general and specific aspects may be implemented using a system, a method, or a computer program, or any combination of systems, methods, and computer programs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
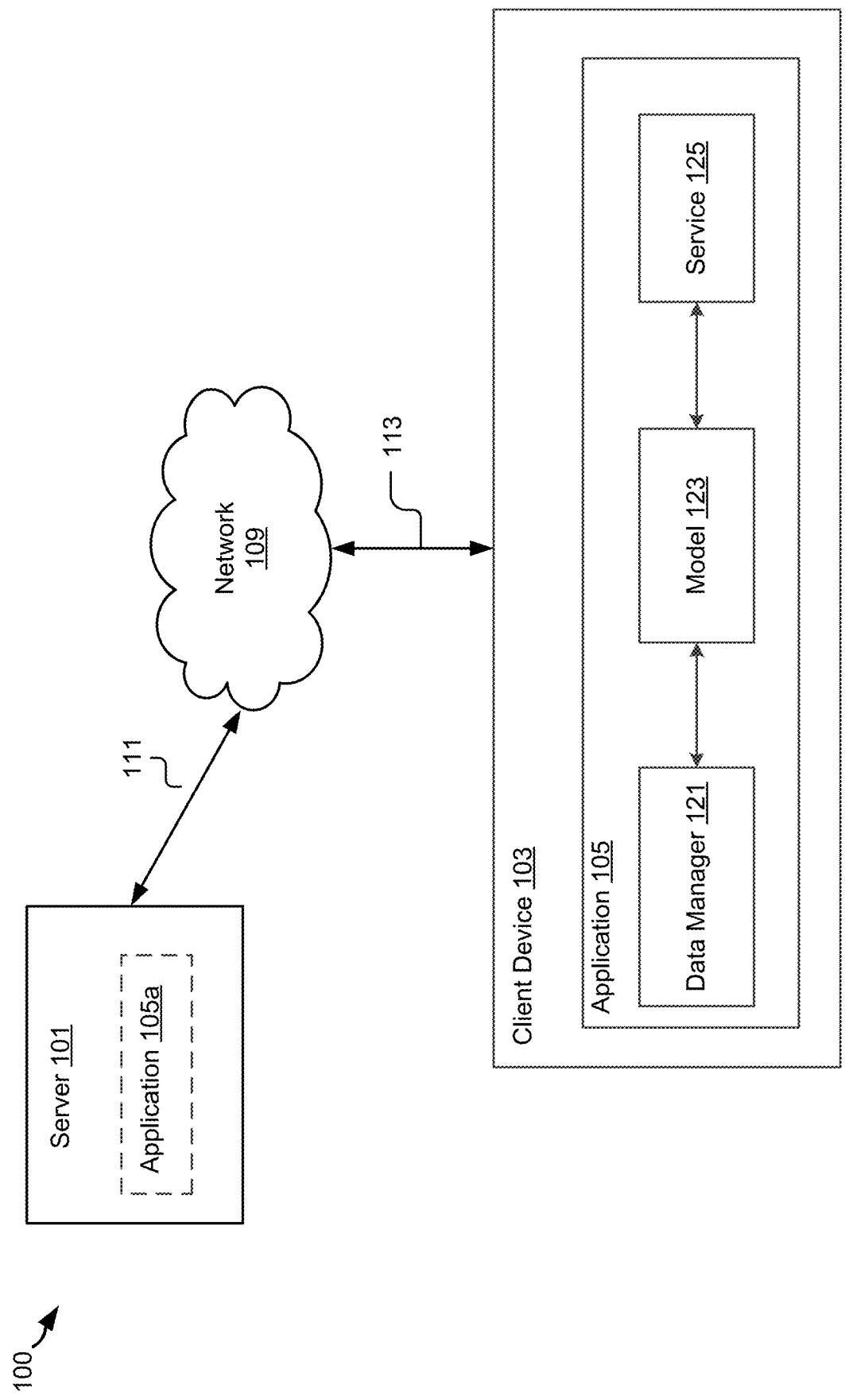
FIG. 1 is a block diagram of an example data processing system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The present disclosure relates to a data processing solution for web client applications to process data (e.g., retrieving data from servers) in a resilient and data-oriented way. The technical solution described herein is to address the performance issues caused by existing large and heavy-loaded client applications. The technical solution dynamically creates an executable API. The technical solution offers high-level abstraction over networking and hides low-level implementation details from consuming services that perform a specific task. The technical solution significantly improves overall application flexibility and performance in managing resources such as reducing memory, bundle sizes, launch time, etc. The technical solution also improves the maintainability and resiliency of the data processing system.

Various tasks may be implemented based on communications between servers and clients. For example, a client may retrieve data from a service. The performance of the tasks may be affected by many factors including execution logic (e.g., retries, redirects, long polling), telemetry and logging of ongoing requests, error boundaries on failures, easiness of use, maintainability of API, etc. However, it is difficult to balance these factors and develop an efficient data processing solution/architecture. Most commonly, web clients implement data service around REST API with a fixed set of functions to process or retrieve data. However, such "all-in-one" API may induce high costs on computer resources such as memory and bundle sizes. Some advanced implementations may have a library of functional logic (e.g., redirecting, retrying, etc.) and use lazy loading to minimize the impact on the memory and bundle sizes from using "all-in-one" API. However, this approach lacks high-level abstractions over internal logic, and opens doors to none-generic per scenario implementations that affect code quality and maintainability. While lazy loading may help reduce the memory and bundle sizes, it affects initial loading time (ILT) when an application is forced to load an external package to fulfill a data processing request. Moreover, lazy loading itself needs expensive error boundaries and retry mechanisms, thereby resulting in growing complexity and less resiliency over networking.

An alternative data processing solution, such as outlook web access (OWA), is to use code generators integrated in a build pipeline to generate APIs based on communications between a hosting server and available client devices/endpoints. However, OWA only works in the event of the occurrence of certain communications between the server and the client. OWA also does not offer functional logic on redirecting, retrying, etc.

Axios (https://github.com/axios/axios) is another approach used in data processing. Axios is a promise-based HTTP client for the browser and node.js. The library of Axios offers a scalable solution to implement and inject custom functional logic over network requests. However, Axios has no support for strongly typed API. Axios also has no support for request middle-ware logic, thereby leaving many low-level details of defining requests to consuming services. Furthermore, the extensibility for request logic in Axios is uncontrollable, which may result in conflicts and server run-time issues.

To address the above-mentioned technical problems in existing data-processing approaches, the technical solution described herein is advantageous in at least the following aspects. The technical solution provides a strongly typed parametrized API. The technical solution is capable of creating APIs on demand, which significantly reduces the memory usage and bundle sizes, e.g., as compared to lazy-loading approaches. The dynamic created API also relieves the application from long loading time. The technical solution includes integrated request logic that is based on formal specifications rather than on implementation, thereby increasing flexibility and better adapting to the service needs. The technical solution also supports a middleware layer that helps to isolate concerns of various components and to result in small functional blocks with better maintainability and resiliency.

In one implementation, the technical solution includes an application architecture that hides the low-level implementation details from a consuming service. The architecture may include four actors: application, data manager, consumer, and models. Each actor is agnostic of the internal logics of another actor. An application creates an instance of data manager with an application context. A data manager or executor includes execution logics such as fetch, retry, etc. The data manager constructs APIs for consumers based on models. A consumer is a service that creates and uses an API based on a set of models and interfaces. A set of models include rules/specifications/descriptions that specify the request management details and logic.

The application creates an executor. The executor is passed with the arbitrary context (e.g., code components, flags). Different applications can define different application contexts. The executor passes the application context to the models to create specifications, which are a set of rules or policies relating to executing functions.

Next, a service running inside the application creates an API or data API with the specifications. The service uses the executor to create APIs. An API is an object containing callable methods for models. The service calls a method of the API to perform a specific task (e.g., retrieving data). When called, the API method is composing and executing actions based on the executor's logic and endpoint description policies to perform the task or fetch data required by the service. Once all the actions are executed, the API returns a result or an object describing a failure of performing the task. In one implementation, it is also possible that a service outside the application may also use this mechanism to create and use the API.

The technical solution allows the executor to create an executable API based on particular specifications. This implementation is dynamically created based on the specifications while the existing art supports a fixed list of implementations. In the existing art, every executable object or implementation is created in built time instead of in the run-time of an application. In contrast, the technical solution allows the implementation to be dynamically created upon a service call in the run-time of the application. Therefore, the loading time and data amount used for the application are significantly reduced.

Also, the actors in the technical solution are independent, and thus allow the consumer to be abstracted from the low-level details (e.g., machine instructions, how many steps to perform to get a result). Therefore, the data consumer/service only provides the necessary information, e.g., providing a chat message when requesting to send the message. A service only knows the message to be sent and to whom to send the message (e.g., a specific recipient identifier). The service does not know the application context, e.g., information about a contractor and how this contractor determines an IP address corresponding to the specific recipient identifier and therefore minimizes the amount of data that the service prepares with. The application context is important when used in determining the IP address, but this context is not passed to the consumer/service when the send message request is executed. Instead, the application context used in executing the sending request (e.g., the contractor information) is only delivered to the model or specification. The service does not know or use the contractor directly. The service also does not know which methods, functions, and actions to be called to get the chat message sent. Therefore, the technical solution is advantageous by keeping a data service free from the knowledge that the service will never use.

FIG. 1 is a block diagram of an example data processing system 100. As shown, the system 100 includes a server 101 and a client device 103 coupled for electronic communication via a network 109. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of servers 101, client devices 103, or networks 109.

The network 109 may be a conventional type, wired and/or wireless, and may have numerous different configurations including a star configuration, token ring configuration, or other configurations. For instance, the network 109 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 109 may also be coupled to or include portions of a telecommunications network for sending data in a variety of different communication protocols. In one implementation, the network 109 includes Bluetooth® communication networks or a cellular communications network for sending and receiving data including via short messaging service (SMS), multimedia messaging service (MMS), hypertext transfer protocol (HTTP), direct data connection, WAP, email, etc.

The server 101 may be a computing device that communicates with and serves information to the client device 103. The server 101 may execute instructions (e.g., application programs, operating system functionality, or both) to implement the operations and functionality associated with the server 101. The server 101 may be a web server or application server that provides static or dynamic content to the client device 103 in response to receiving a data processing request from the client device 103. For example, the server 101 may be a web server that accepts and fulfills requests (e.g., hypertext transfer protocol (HTTP) requests) from the client device 103, and responds to the client device 103 with the content (i.e., hypertext markup language (HTML) pages, files, images, and videos) of a website. The server 101 is communicatively coupled to the network 109 via signal line 111.

The client device 103 may include virtual or physical computer processors, memor(ies), communication interface(s)/device(s), etc., which, along with other components of the client device 103, are coupled to the network 109 via signal lines 113 for communication with other entities of the system 100. For example, the client device 103, accessed by end-users (not shown), may send and receive data to and from the server 101, and may further analyze and process the data. Non-limiting examples of client device 103 may include a laptop computer, a desktop computer, a tablet computer, a mobile telephone, a personal digital assistant (PDA), a mobile email device, or any other electronic devices capable of processing information and accessing the network 109.

As depicted, the client device 103 includes an application 105. The application 105 is software that performs specific tasks. For example, the application 105 may be Microsoft Teams® application, Outlook® application, Word® application, etc. In one implementation, the application 105 may communicate with the server-side application 105a residing on the server 101 to manage and control the execution of specific tasks. For example, one essential task that the application 105 performs is to fetch data from the server 101 and return the data when the data is requested by the client device 103. The present disclosure provides a resilient and data-oriented solution for data processing. The technical solution dynamically creates an API during run-time of an application to respond to data processing requests from a consuming service. In other words, an API is triggered only when a consuming service needs to process data. Therefore, the bundle size and launch time of the application are reduced, and the network and computer resource usage during the running of the application is decreased. The technical solution also hides the low-level aspects of processing data-processing requests, e.g., the detail of a browser's API, from the consuming service, thereby significantly simplifying the way that the consuming service processing data. In one implementation, the technical solution separates application components involved in the data processing into independent actors. Each of these actors may include isolated logics and is agnostic of each other. However, these actors are capable of running together and delivering a success/failure result for the data processing. Therefore, dynamic implementations and high-level abstraction are achieved.

In the illustrated implementation, the technical solution includes four independent actors: the application 105, a data manager 121, a model 123, and service 125. The application or web client application 105 may create an instance of data manager 121 and provide arbitrary application context to the data manager 121. The data manager 121 may construct data application programming interfaces (APIs), orchestrate data calls with the model 123, and provide network states and operation health notifications. A set of models, or collectively the model 123, may include specifications that describe and manage network requests and direct the data processing logic. The service 125 is the data consumer that creates and uses the API based on the set of models 123.

The actors and associated roles may be illustrated using an analogous practical example. Suppose the application 105 can be mapped to a mail processing application in a post office. The mail processing application has a set of rules or policies, e.g., insurance policies, authorization policies, retry policies, for processing mails or parcels. These rules/policies are comparable to the model 123. When a customer/consumer comes to the post office to send a mail, the customer provides the letter and address. This customer service or service 125 triggers a specific data processing procedure i.e., through an API. The service 125 may request or fetch data when the mail is being processed. For example, the customer may receive a confirmation or denial of sending the mail, the progress data of sending the email, etc. To process the mail, a post office clerk may act as the data manager 121 to execute the rules, e.g., determining which route to send the letter, which truck to be used on that route, based on the letter and address provided by the customer. From the viewpoint of service 125, the data is processed without the consumer or service knowing how the mail is being handled (e.g., the route, truck) by the clerk (i.e., the data manager 121) based on the set of rules (i.e., the model 123). Therefore, the low-level aspects of implementation are behind the underlying technology and hidden from the consumer or service that requests the data. The data processing process based on actors will be described in more detail below with reference to FIGS. 2-6.

While the data processing procedure is described below in view of a client-side application 105, in another implementation, similar actors and structures may also be applicable on an application residing on a cloud server such as the server-side application 105a shown in the dashed box to similarly perform data processing tasks.

Figure 2:
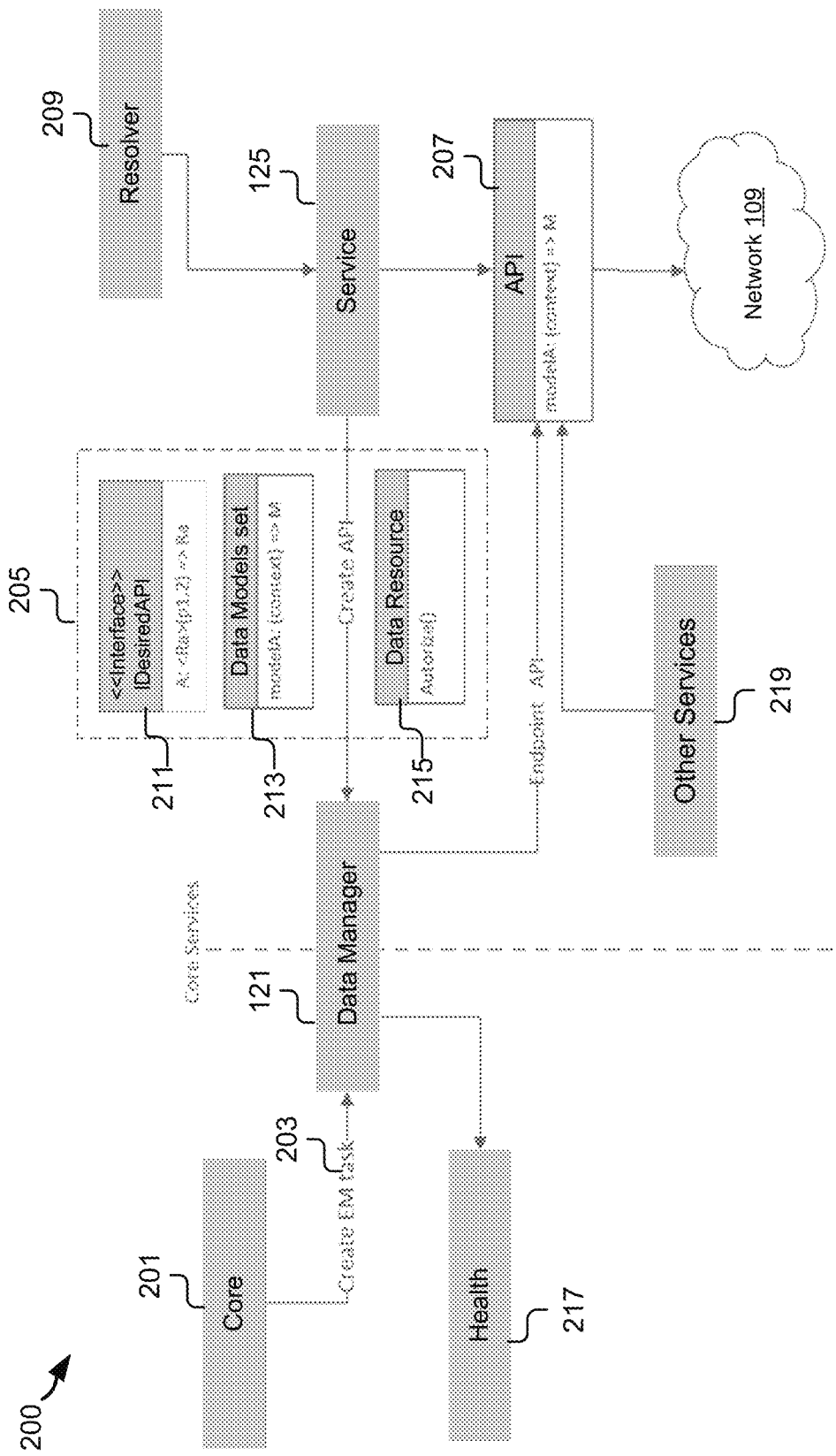
FIG. 2 is a block diagram of an example flow for performing a data processing task using an application.

FIG. 2 is a block diagram of an example processing flow 200 for performing a data processing task using an application. Each application has an arbitrary context (e.g., code components, data, flags, etc.) that loads the configuration of the application. Different applications may have different arbitrary application contexts. In one implementation, the application 105 creates an instance of data manager 121 with the application context. For example, the core 201 of the application 105 may create a data manager (EM) task 203 to generate an instance of data manager 121 and send the application context to the data manager 121. The data manager 121 is part of the core services. The data manager 121 defines execution logic that manages a data processing flow. The data manager 121 passes the received application context to a data set 205, and the data set 205 creates a list of data specifications using the application context. The specifications, also referred to as descriptions, rules, or models, describe logics of endpoints and provide policy callbacks. An endpoint is a function of an API 207 that is used to perform a specific task, e.g., fetching data from the server 101.

It should be noted that the data manager 121 merely passes the application context to the data set 205 without recognizing and using the context. Because it is the data set 205 (not the data manager 121) that uses the application context to construct the specifications or models, there is no need for the data manager 121 to know what is included in the context. In this way, each component or actor, e.g., the data manager 121 or the data set 205, only handles the information needed to perform their corresponding functionalities and therefore minimizes the processing load of each component. As described below, this isolation or abstraction mechanism is also applied to other actors of the data processing system 100, and ultimately allows the goal of freeing the consuming service 125 from low-level request managing in a data processing process to be achieved.

In one implementation, the data manager 121 defines execution logics such as logics for fetching, retrying, redirecting, authenticating, etc. The data manager 121 also communicates with other components of the application 105 to create the API 207 based on interfaces and descriptions in the data set 205, where the descriptions may be provided by the service 125. Therefore, the data manager 121 dynamically creates an API 207 when it is needed by the service 125. The API 207 includes callable methods used by a client service to perform a task such as fetching data from a server. A method calls a function to fulfill the request from the client service for performing the task or fetching data. Since the data manager 121 includes execution logics and is used to create an executable object (i.e., API), the data manager 121 is also referred to as an executor. The data manager or executor 121 may further provide services for tracking API execution (e.g., health information), collecting telemetry, etc.

In one implementation, the service 125 may request/call the executor 121 to create the API 207. Responsive to receiving the request from the service 125, the data manager or executor 121 creates the API 207 with interface specifications and a set of models from the data set 205.

The service 125 may be a portion inside the application 105 that consumes data. When consuming or fetching the data, the service 125 provides parameter(s) to have certain specifications or rules to be created in the data set 205. For example, the specifications may specify whether the service 125 wants to retry, whether an authorization is required, etc. The resolver 209 may be used by the service 125 to obtain the parameters specific to a data processing request. The data set 205 in the dashed box includes three portions: interface 211, data models set 213, and data resource 215. The interface 211 may parameterize a request from the service 125 when the service 125 sends a data processing request associated with one or more parameters. For example, the interface 211 may include a formal interface description A: <Ra> (p1, 2)→Ra as shown in FIG. 2. The data models set 213 may include models or model specifications 123, which are formal descriptions or rules of endpoints that both the executor 121 and the service 125 agree upon. The model descriptions indicate how the executor 121 should manage a function and the execution of the function. For example, a model 123 may specify a set of rules regarding what to do in response to receiving a request from the service 125, what types of calls from the service 125 are acceptable, etc. In one implementation, for every callable method or endpoint in the API 207, the service 125 may have a corresponding model created in the data models set 213. The data resource 215 may include an authentication function specifying how to authenticate a request from the service 125, e.g., decorating the request with authentication headers and resolving authentication claims.

Upon receiving a request from the service 125, the data manager or executor 121 creates the API 207 from the data set 205. The API 207 is an executable object containing callable methods for every model 123 provided by the data set 205. In one implementation, the executor 121 may share the application context with the data set 205 such that the basic/initial data description provided by the service 125 can be transformed to a final description that is understandable by the executor 121. For example, the initial specification may include some identifiers (e.g., usernames), and these identifiers may be resolved and transformed into information that is understandable by the executor 121 (e.g., IP addresses). Therefore, when the API is requested, the executor 121 creates an executable object by resolving each method of the requested interface to an executive function based on a corresponding model 123. The executor 121 returns the executable object, i.e., the API 207, to the service 125.

The API 207 is an object containing callable methods for every model 123 provided by the data set 205. Once the API is created, the service 125 may call a method of API 207 to perform a specific task such as retrieving data from the server 101. When the API method is called, the executor 121 composes and executes corresponding actions based on the executor's logic and description policies to perform the task or fetch the data from the server 101. When all the actions are executed, the API 207 returns to the service 125 a result of performing the task. The result may indicate the task is successfully performed. For example, the result includes the fetched/required data. The result may also indicate the failure of performing the task. For example, the result includes an object describing a failure to fetch the data. As depicted, the interface "IDesireAPI" may specify a "model A" as a method based on a data processing request from the service. The executor 121 may then create a function for executable method A in the API 207. When the service or consumer 125 calls the API 207 for executing the request with method A, it appears to the service 125 that the service 125 only calls the function with parameter(s) in the API 207 for executing the function through a set of actions. When an API 207 is created, the service 125 may call any function or method in the API to execute a request to perform a task (e.g., fetching data from the server 101).

Below includes pseudocode that illustrates how the data processing process works.

/** The interface specifies one method—getSomething. EM will create an executive function for orchestrating the call with corresponding getSomething model*/
interface MyInterface {
  getSomething(paramter1, prameter2)
}
/** Service creates EM instance */
endpointManager=createEndpointManager(myApplicationContext)
/** Service creates an API for MyInterface */
api=endpointsManager.createApi<MyInterface>(endpointsSet)
/** Service gets data from server by calling an API method */
myData=api.getSomething("paramter1", "parameter2")

In addition to creating APIs, the data manager or executor 121 may also track the API executions and expose meta-information such as history, health, telemetry, etc. For example, as depicted in 217, the executor 121 may track the health of individual and groups of endpoints/functions to determine endpoint/function availability through endpoint/function subscription. A function that responds as expected is considered to be "healthy." The executor 121 may also detect network states that enable consumers or services to react to network outages.

One advantage of the technical solution described herein is that the data manager 121 is capable of creating executable objects at a run-time of the application, that is, dynamically creating an executable API 207 upon a request and particular specifications from the service 125. The existing techniques support a fixed list of implementations or methods, i.e., all executable objects are created at the built time of an application. Some applications may have a lot of fixed methods. When an application is loaded and executed, not every method of these many methods is needed. However, the existing techniques include all methods in APIs when the application is built even if some methods will never be used. Therefore, the application is large and heavy-loaded. In contrast, the technical solution includes only specifications on designed implementations/methods, and dynamically creates the implementations during the run-time when a service calls and provides parameters to create an implementation. Therefore, the technical solution creates an API 207 dynamically and on-demand when the API 207 is needed and used by the service 125. For example, an existing application may include an API for authenticated users and an API for anonymous users. For an authenticated user, the application will never trigger the API for anonymous users, but this anonymous user API will still be loaded in memory when the application launches. The technical solution, however, supports creating only the authenticated user API when it is requested. As compared to the existing techniques, the technical solution allows the application to start faster, use less memory, and thus become more manageable.

Another advantage of the technical solution described herein is that the executable object or API 207, once created, may be shared between different consuming parts of the application 105, i.e., with other services 219. This is important for complex applications with different services. The core service of the application may find similar functionalities between services and share specific APIs between the services even if these services have very limited knowledge of each other. For example, if a chat service of Microsoft Teams® application requests and creates an API to fetch data of meeting attendees to send a chat message, another service for displaying the meeting attendees may share this API to use the same executable object instead of creating its own executable API. This would optimize and help to reuse a significant amount of code, thereby reducing the application processing burden and improving application performance.

The technical solution is also advantageous in hiding low-level request managing aspects from the consumer or service 125. For example, the service 125 initiates a request with parameters to obtain data. The service 125 is agnostic of underlying execution details such as the actions, e.g., authorizing the request, resolving a URL, to be taken to obtain the data. The executor 121 determines the action list and generates the executable actions based on the parameters so that the service 125 can obtain the data based on the execution of the actions. In short, the data manager 121 provides a way to create an API for performing a specific task based on interface specifications and a set of models that are customized with parameters. The API created for the service is free of request/response knowledge and is used as simple as a function call returning a typed result. In this way, the high-level abstraction that leaves complicated implementations to the executor 121 and simplifies the data processing process for consuming services is achieved.

Figure 3:
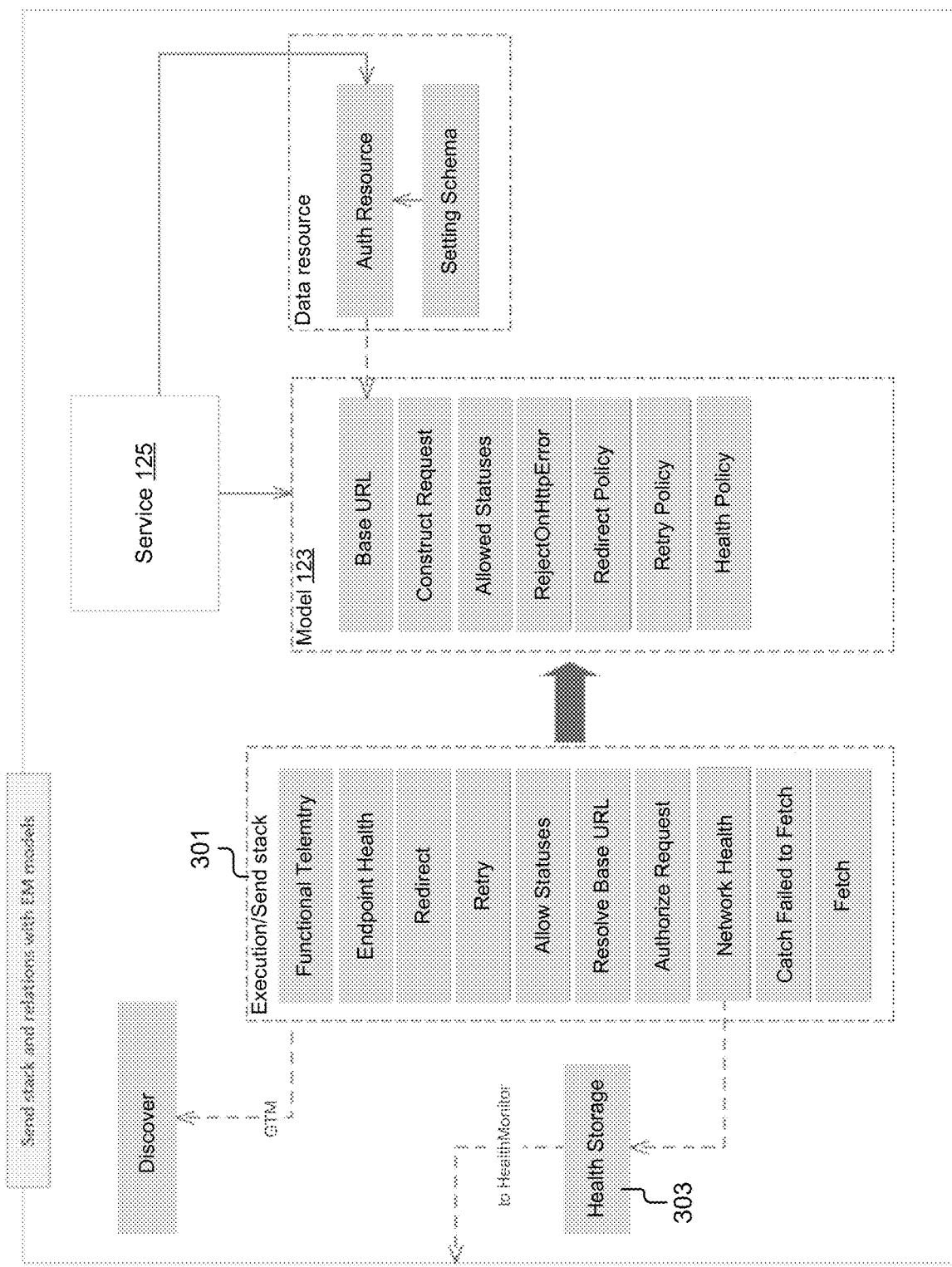
FIG. 3 is a block diagram of an example procedure for executing a request received from a service.

FIG. 3 is a block diagram of an example procedure 300 for executing a data processing request received from a service. In response to the service 125 sending a request for performing a specific task or fetching data, a method of an API 207 or the executable object is executed to return a result of performing the specific task or fetching the data to the service 125. The result may include an indication of a success or a failure to perform the task, for example, either the fetched data or an object describing a failure to fetch the data.

As depicted in FIG. 3, the model 123 includes a set of rules or specifications. The specifications specify the properties of the request. The properties are used to execute the request. Example properties may include "allowed statuses" that shows what response may be accepted, "redirect policy" that turns redirect logic when specified, "retry policy" that turns retry logic when specified, "health policy" that retrieves a history of responses and returns a state of an endpoint, etc. The specifications/descriptions/rules in the model 123 describe network requests and define policies matching the logic of the executor 121. The specifications are not arbitrary context. Both the executor 121 and the consumer/service 125 agree and understand the specifications.

When creating executable objects or APIs, the executor 121 includes the functions in the execution stack or send stack 301. The executor 121 creates a function for every method in a provided interface that orchestrates the request with a corresponding model. The functions in the send stack 301 actively communicate and compose the executive actions during the run-time. For example, in FIG. 1, "model A" is an executable method inside the API 207. When the service 125 calls "model A" to perform a task or retrieve data, the send stack 301 gets called for execution. The send stack 301 may perform other operations. For example, the send stack 301 may track the execution of the API 207 and provide network health states such as gathering and transmitting health data to the health storage 303, which will be described below in more detail with reference to FIG. 4.

The send stack 301 defines the execution logic. In one implementation, when a request is executed, based on the execution logic, each function in the send stack 301 inquires the model 123 to provide the specifications so that the function can respond to the request through a set of actions. For example, to respond to the request of sending a mail from a consumer in post office, a mail clerk executes the rules/specifications (e.g., deciding which truck to use) through a set of actions. The send stack 301 handles the communications between the function and specification on every step or action of executing a request and producing a response. For example, if the execution of a first action for responding to a request fails to provide the desired response, the function will determine whether to retry the request in the next action based on the retry policy in the model 123. Every action is actively communicated to one or more specifications or rules. Once the functions or actions are executed, either the requested data is reported to consumer/service 125 or a failure object is returned (even if the rules or the specifications have been applied). It should be noted that the send/execution stack 301 interacts heavily with the specification/models 123 to create the API 207 and to respond to a request for the service 125.

The specifications, to which the send stack 301 refers when executing a method to fulfill a request from the service 125, may also be updated. In one implementation, an initial specification of the model 123 may be transformed or customized to a final specification when executing the method. The final specification may include the information that is needed for executing the method to fulfill the request. For example, in Microsoft Teams® application, when a chat service requests to send a chat message to some meeting attendees specified by meeting identifiers, the model 123 needs to determine the real identifiers or the IP addresses corresponding to each of the specified meeting attendees in order to send the chat message. The final specification, therefore, includes the determined identifiers or IP addresses. The final description is used by the function created for the method to compose and execute the set of actions.

In one implementation, the final specification may be constructed depending on the application context. The executor 121 receives the arbitrary application context from the application when it was created. This context is passed to executive functions in the sender stack 301 and to the model 123. In one implementation, based on the application context, the model 123 may be able to construct the additional or missing information needed for executing the service request. However, in another implementation, an external contractor or contractor service may be used to determine the additional or missing information that the model 123 may not be able to resolve. The information of the external contractor is contained in the application context. Therefore, the model 123 may identify a contractor service outside of the application from the application context, and determine the information needed to create the final specification using the contractor service based on one or more parameters received from the service request and the initial endpoint specification. In other words, the model 123 may communicate with the outside contractor to help to resolve additional information, e.g., determining the actual ID or IP addresses that correspond to the identifiers specified in the request. Neither the executor 121 nor the service 125 holds any information about the contractor. Therefore, neither of them can communicate with the contractor to resolve the data needed for the final specification. The model 123 isolates this resolving functionality from other actors, which advances the abstraction.

The final specifications of the model 123 are created and used by the service 125 that consumes or fetches data. This is similar to the scenario where, when a consumer comes to the post office with a parcel, fills out papers (i.e., sending a request), provides information or parameters (e.g., a zip code), the information on the paper is converted or resolved to a physical location. The transformation of the original/initial specification (e.g., the rule on the paper) to a final specification including the needed data (e.g., physical location) may be based on an outside/external contractor.

In one implementation, the executor 121, in communication with the model 123, executes the functions in the send stack 301 to transform the set of rules or final specifications in the model 123 to machine instructions. The executor 121 creates and returns a wrapper, which hides the complexity of the underlying machine instructions from the service 125. The execution of the wrapper returns a data processing result to the consumer or service 125. The result may include an indication of a success or a failure to perform the task, for example, either the fetched data or an object describing a failure to fetch the data.

The technical solution described herein provides high-level abstraction by offering complex applications a separation of concerns using the architecture of actors. The actors, i.e., application, executor/data manager, model, and service, allow different aspects of requests to be handled in small functional blocks. These blocks do not know each other and thus do not have cross-dependencies mapping. Therefore, maintainability and resiliency in a data processing procedure are improved.

The data manager or executor 121 transmits the application context to the model 123. The executor 121 does not have any knowledge of the application context or enforce the application context. Therefore, different applications, e.g., Microsoft Teams® and Outlook® associated with different services, may pass different kinds of application context to the executor 121. This application context is not limited in content or formats.

The model 123 creates the specifications based on the application context passed by the executor 121. The specifications are understandable to the executor 121 because of the mutual agreement between the executor 121 and the model 123, but the executor 121 does not know the content of each specification. The model 123 may resolve additional or missing information based on the application context that is unknown to the executor 121. In one implementation, the specification is an executable object and thus can communicate with an outside contractor(s) to return additional information. As mentioned above, the implementation to generate a final specification based on resolving the additional and/or missing information is only performed by the model 123 although the generated specification is understandable to the executor 121. The model 123, acting as middleware, operates on the arbitrary application context and relieves at least the consuming service 125 from the low-level action composing and function executing.

Once the final specification(s) is created, the executor 121 may create a wrapper and return the wrapper to the service 125 for executing a request. The wrapper has all underlying instructions wrapped, i.e., the send stack 301 included in the executor 121 frames the request with provided information and hides the processing and managing of the request from the service 125. Putting it another way, the executor 121 executes the low-level instructions, while the consumer is built on the data and hidden from the low-level information. For example, the service 125 has no knowledge regarding how many times a request is tried, how many actions to perform to fulfill the request and get a result, etc. This further advances the abstraction.

Figure 4:
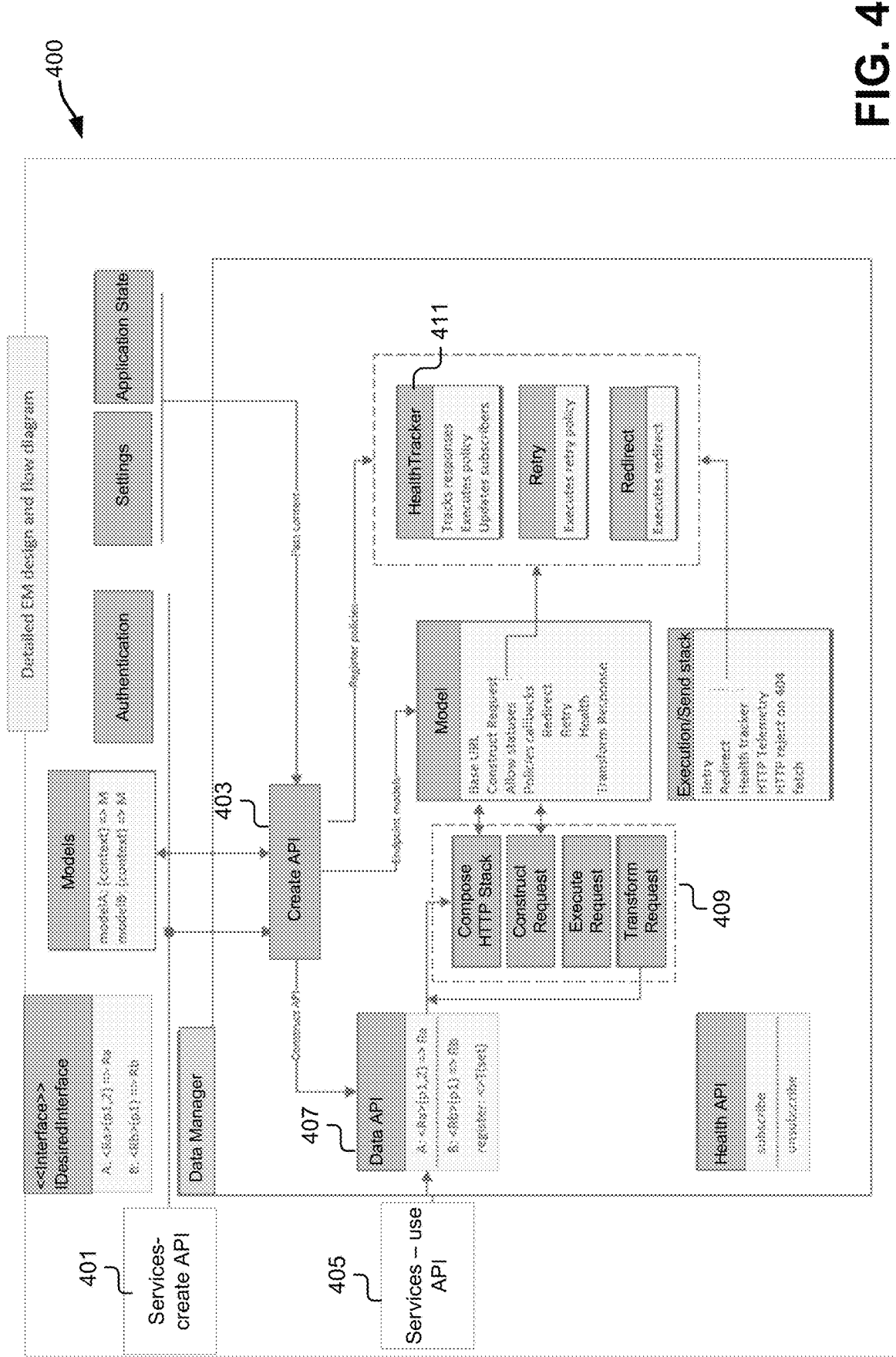
FIG. 4 is a block diagram of an example design of a data manager for executing a request received from a service.

FIG. 4 is a block diagram of an example design 400 of a data manager for executing a request received from a service. The data manager 121 is designed as a separate package with minimal dependencies such that it may be effectively transmitted from one application to another application. Instead of exposing "all-in-one" fetch API, the data manager 121 serves as a factory of APIs that each consumer/service would use to create its own set. The data manager 121 creates a strongly typed API based on provided interface and set of models. As compared to a weakly typed API, the strongly typed API enforces stricter typing rules compile time, and therefore allows the behavior of operations more predictable. The data manager 121 also does not expose http stack building functions but rather compose logic based on properties provided by the model 123. The data manager 121 also provides a way to customize requests and define policies for retry, redirect, and health tracking logic. The data manager 121 also tracks responses and notifies subscribers of continuous failures instead of losing connectivity. The data manager 121 may further track network states and provide a way to notify consumers when a state changes, have telemetry and track performance latency for every request, provide clear error boundaries, etc.

When an application starts, the core service of the application initializes and creates the data manager 121 with arbitrary context (e.g., settings, configs, other services). The data manager 121 passes the application context to a data set 205. The data set 205 creates a set of models 123 (e.g., initial specifications) using the application context. As depicted, the service 125 included in the application sends a request in 401 to create an API. Upon receiving the request in 401, the data manager or executor 121 creates the API in 403. As described above in FIG. 2, the data manager 121 may create an API 207 from the data set 205 using the interface specifications, the set of rules in the model 123, etc.

The service 125 sends a request in 405 to use the created API. Through the API or data API in 407, the service 125 passes the parameters and asks the data manager 121 to execute the request. When creating the API, the data manager 121 creates an object with all the methods of the requested interface resolved to an executive function, and the executive function connecting API with the corresponding model 123. When the service 125 sends a data request or calls an API method, as depicted in 409, the executive function may construct the request, compose http stack building functions, and provide error boundaries for the request. The executive function also forms a pipeline by passing the parameters into model 123 for constructing the request. The function then executes the request and transforms the result based on content type, logs failures, etc.

The data manager 121 also tracks the execution of APIs and provides network health states. For example, the data manager 121 includes a health tracker 411 that tracks a history of endpoint or function's responses and communicates the history with the health policy from the model 123 to resolve the endpoint/function health state. A health policy answers the question "is endpoint healthy?" If the endpoint/function responds as expected, it is healthy. Once the model 123 detects that a state has changed, the data manager 121 would send a notification. This notification may be processed externally by subscribers. A subscriber may subscribe to the health states of one or many endpoints/functions.

Figure 5:
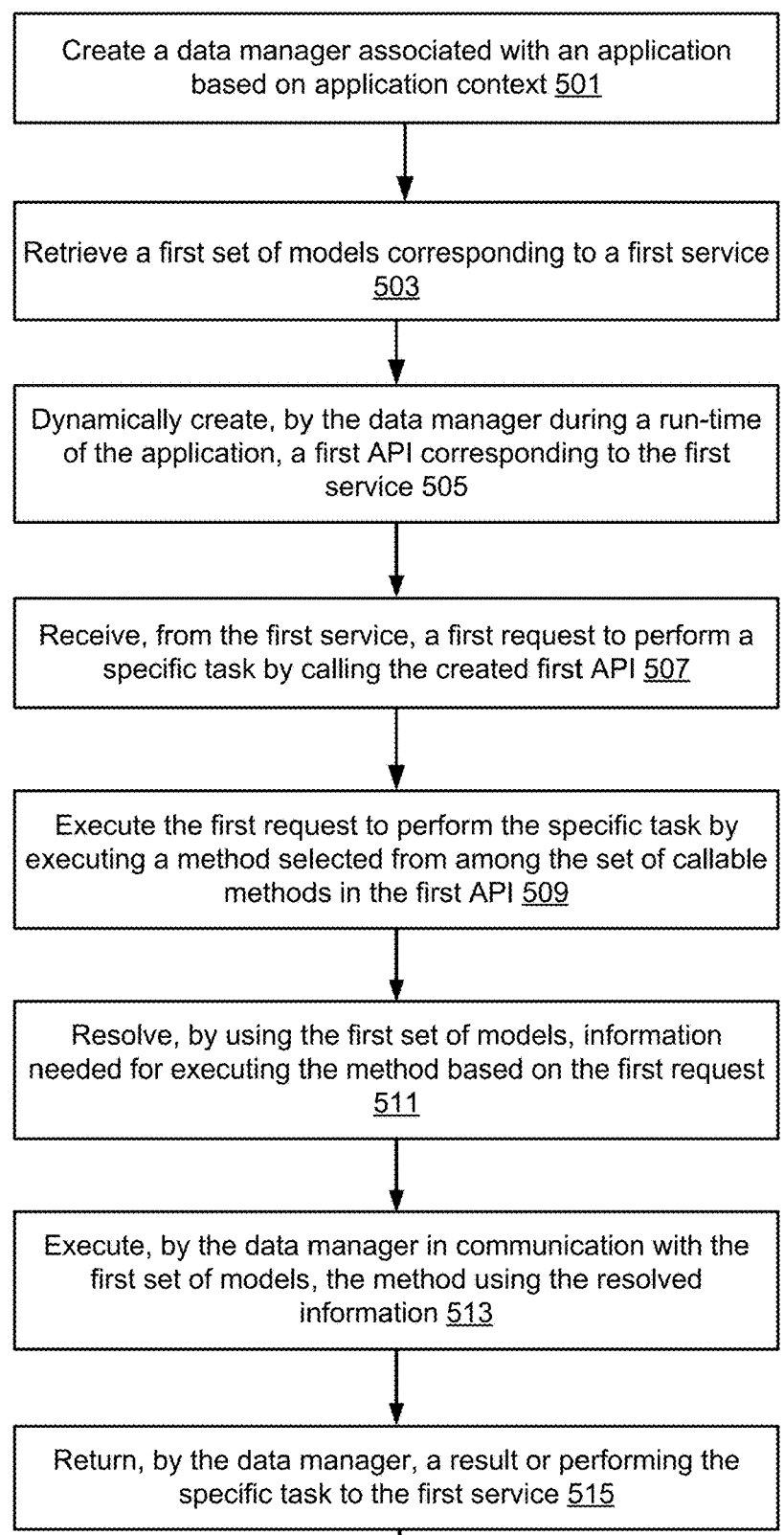
FIG. 5 is a flowchart of an example procedure for executing a task by a consuming service.

FIG. 5 is a flowchart of an example procedure 500 for executing a task by a consuming service. At block 501, the core service of an application creates a data manager 121 associated with an application based on application context. The data manager defines execution logic that manages a data processing flow. The application context provides configuration information of the application. The application context includes at least code components, data, flags, or other arbitrary context to the application. The data manager 121 may create an API by creating a function for every method in a provided interface that orchestrates a request with a corresponding model, mount required execution logic based on policies defined in models, track ongoing responses and provides endpoint/function and network health states, define a standard on error boundaries and provide high-level response code for consuming services, etc.

At block 503, the data manager 121 retrieves a first set of models corresponding to a first service (e.g., service 125). The first set of models include a list of specifications. The specifications describe network requests and define the rules and a set of policies matching the execution logic of the data manager 121. At block 505, the data manager 121 dynamically creates, during run-time of the application, a first application programming interface (API) (e.g., API 207) for the first service or service 125. The first API includes a set of callable methods based on the rules specified in the first set of models. At block 507, the model 123 receives, from the first service, a first request to perform a specific task by calling the created first API. At block 509, the first service or service 125 executes the first request to perform the specific task by executing a method selected from among the first set of callable methods in the first API 207. To execute the method in the first API, at block 511, by using the first set of models, the information needed for executing the method is resolved based on the first request. At block 513, the data manager 121, in communication with the set of models, executes the method using the resolved information. At block 515, the data manager 121 returns a result of performing the specific task to the first service. The result includes either an indication that the specific task is successfully performed or a failure message of performing the specific task.

It should be noted that an API is only created upon the data processing needs from a service. The as-needed API is dynamically created based on the specifications from the service while the existing art supports a fixed list of implementations. In the existing art, every executable object or implementation is created in the built time instead of in run-time of an application. In contrast, the API described herein is dynamically created upon a service call in the run-time of the application. Therefore, the loading time and data amount used for the application are significantly reduced.

While each actor—application, service, data manager, and model, has its own logic and data, these actors can work together to perform a specific task for the service. Such data processing process particularly may allow the consuming service to be abstracted from the low-level details (e.g., machine instructions, how many steps to perform to get a result). The data-consuming service 125 only provides the necessary information, e.g., providing a chat message when requesting to send the message. The data manager 121 and the model 123 may interpret the message/parameters passed by the service 125, and change the request of sending the message to executables while hiding the underlying steps and actions for executing the request. For example, the service 125 does not know the application context, e.g., how to determine an IP address (e.g., used for generating executables) corresponding to a specific recipient identifier (e.g., provided by the service 125), and therefore minimizes the amount of data that service 125 prepares with. The application context is important when used in determining the IP address, but this context is not passed to the consumer/service 125 when executing the send message request. Although this context is used in executing the sending request, it is only delivered to the model or specification 123. The service 125 will never use the contractor directly by itself. The service 125 also does not know which API, method, function, and actions to be called to get the chat message sent.

In general, the technical solution described herein removes dependences. For example, the dependencies such as the contractors and application context, which is delivered to a service by existing approaches, is removed from the service 125 since the service 125 does not need such information. All the low-level data (used to be managed by the service) is moved away from the service 125 to the model or specifications 123. The specification receives the application context from the data manager 121 and from the application such that the specification is able to create the final description used for the execution of the request from the service 125. The specification is outside the service 125, and thus frees the service from handling the specifications as the existing approaches are currently doing. The executor 121 creates the API for service 125 based on the specifications that have been moved outside from the service 125. When a data processing request is implemented inside the service 125, the service 125 calls in a transparent level, the executable object created by the API. In this transparent level, the service only manages the data request to fulfill the data request and thus gets a short responding time.

Figure 6:
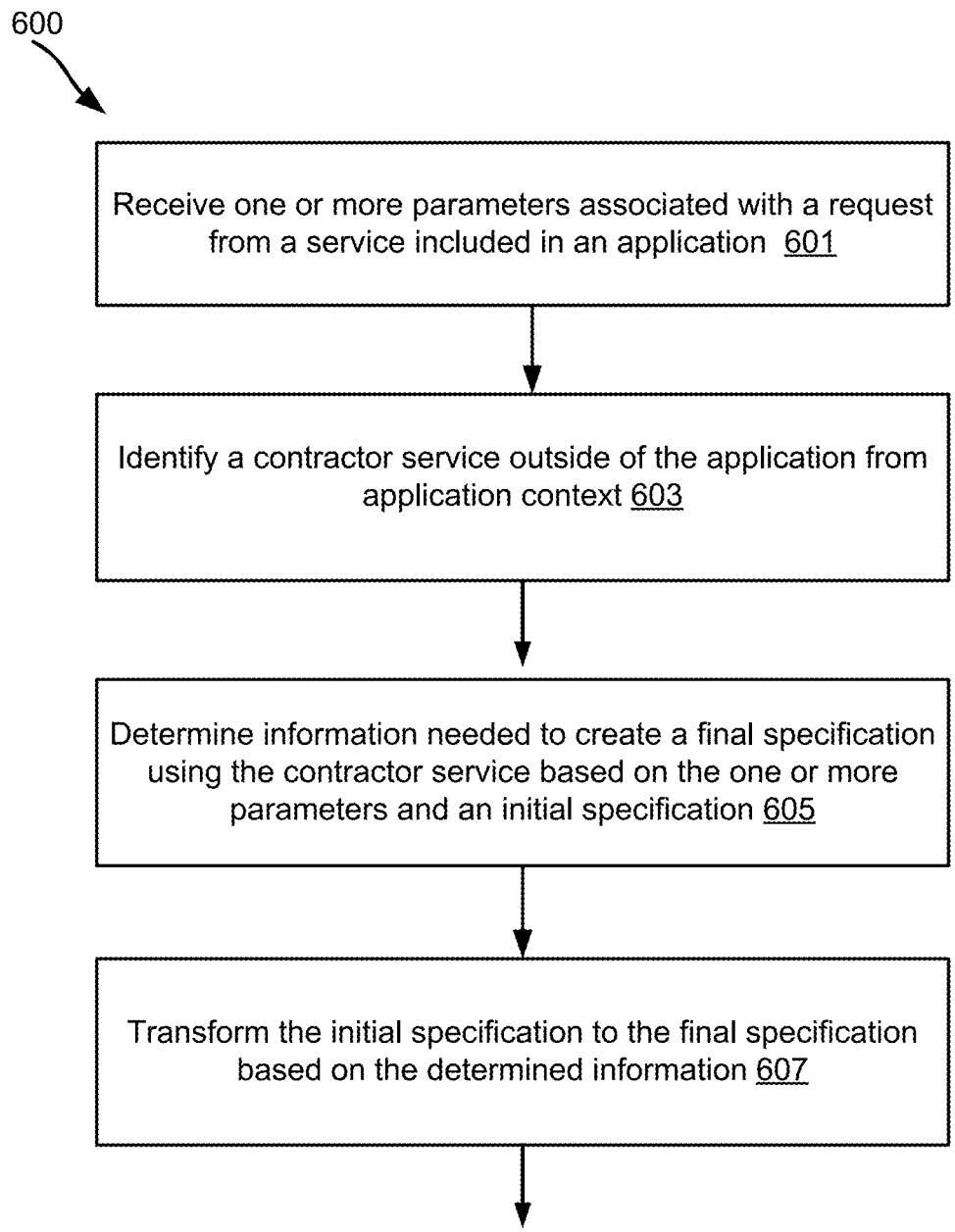
FIG. 6 is a flowchart of an example procedure for finalizing a specification of a model.

FIG. 6 is a flowchart of an example procedure 600 for finalizing a specification by the model 123. At block 601, the model 123 receives one or more parameters associated with a request from a service included in an application. At block 603, the model 123 identifies a contractor service outside of the application from the application context. At block 605, the model 123 determines information needed to create a final specification using the contractor service based on the one or more parameters and an initial specification. At block 607, the model 123 transforms the initial specification to a final specification based on the determined information.

Figure 7:
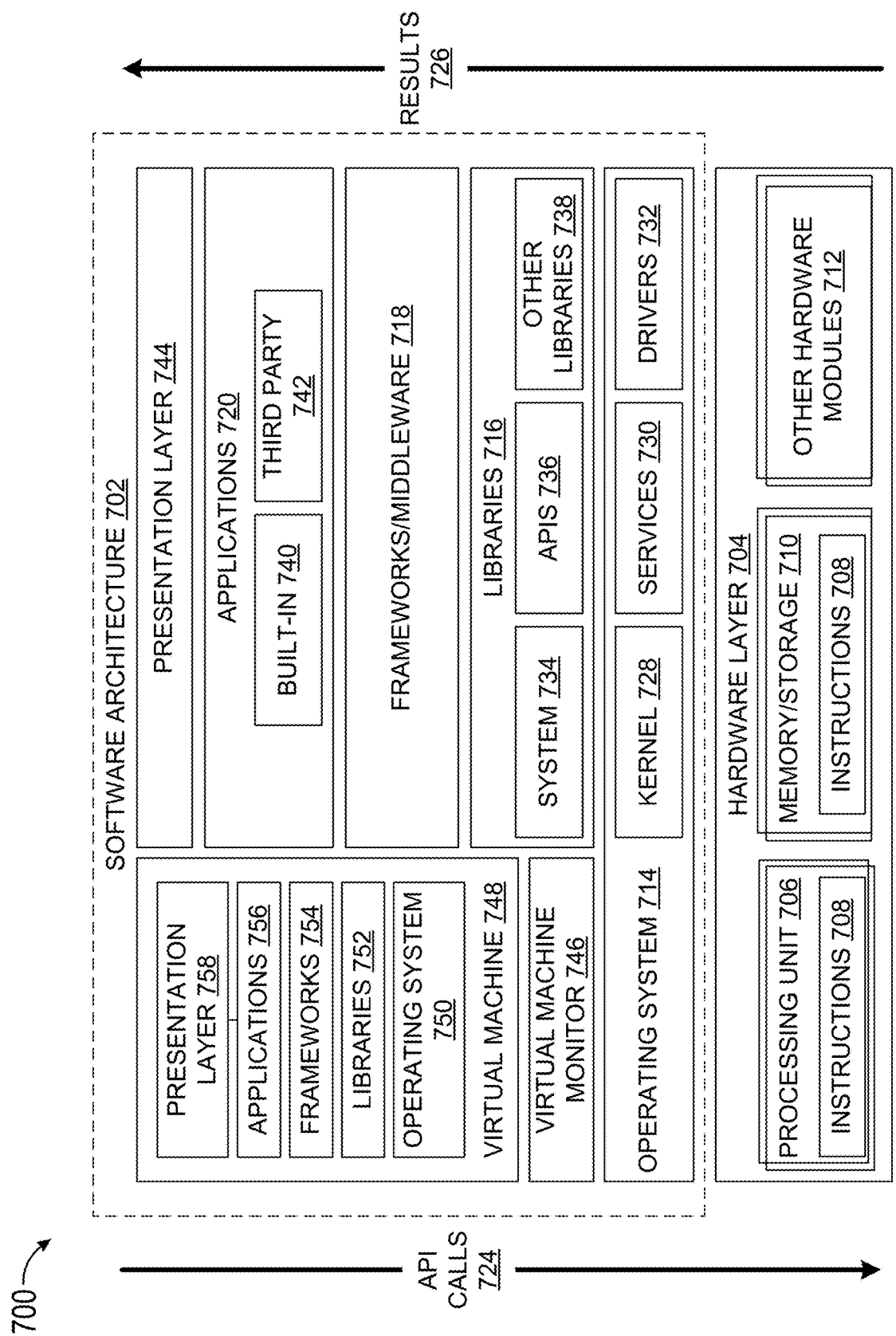
FIG. 7 is a block diagram illustrating an example software architecture.

FIG. 7 is a block diagram 700 illustrating an example software architecture 702, various portions of which may be used in conjunction with various hardware architectures herein described, which may implement any of the above-described features. FIG. 7 is a non-limiting example of software architecture and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 870. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules, and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
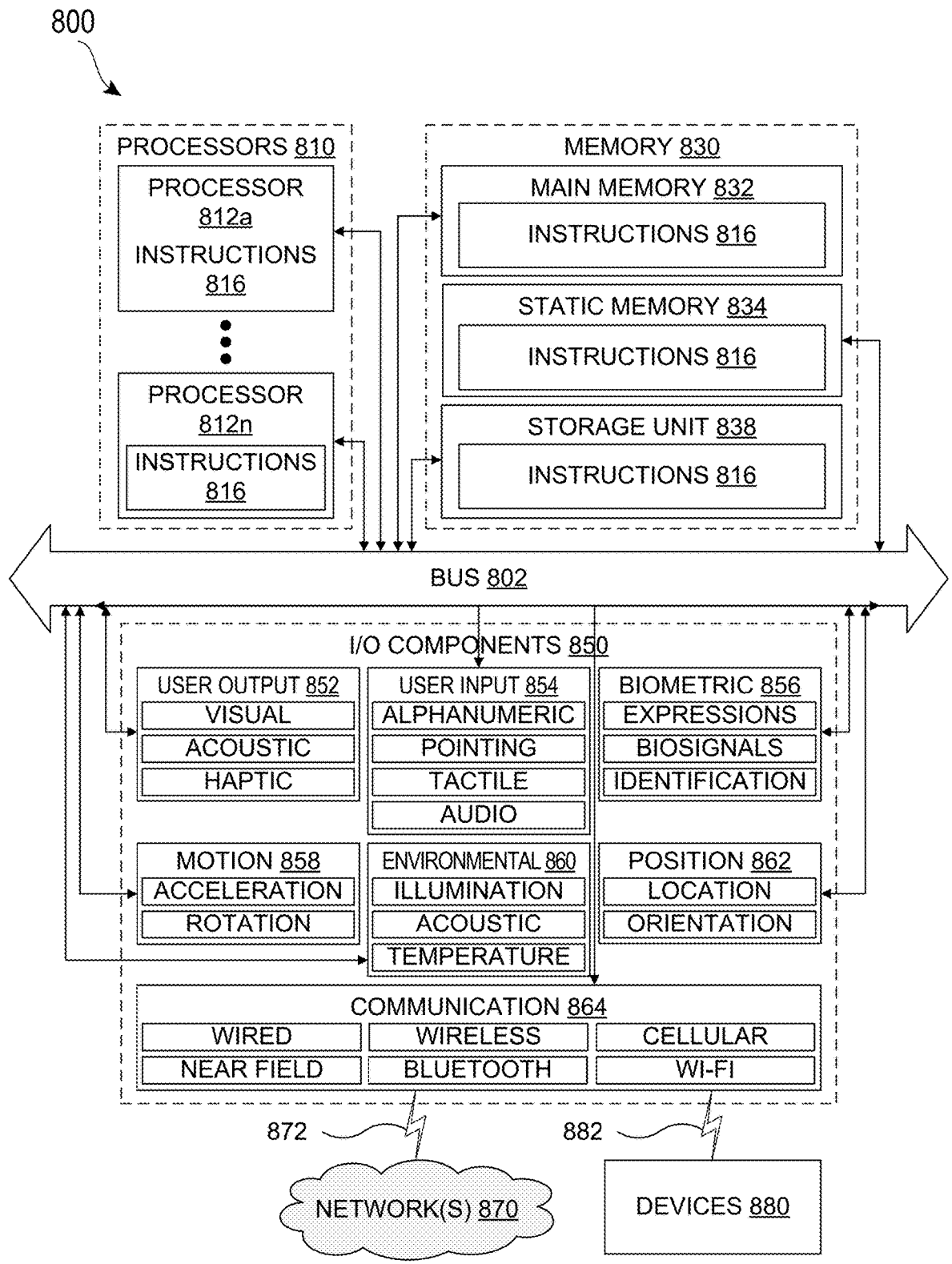
FIG. 8 is a block diagram illustrating components of an example machine configured to read instructions from a machine-readable medium.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 838, both accessible to the processors 810 such as via the bus 802. The storage unit 838 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 838, within at least one of the processors 810 (for example, within a command buffer or cache memory), within memory at least one of I/O components 850, or any suitable combination thereof, during execution thereof. Accordingly, the memory 832, 834, the storage unit 838, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 884 may detect identifiers or include components adapted to detect identifiers. For example, the communication components 884 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 106, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for facilitating data processing based on dynamically-created application programming interfaces (APIs), the system comprising:
   a processor; and
   a memory, coupled to the processor, configured to store executable instructions that, when executed by the processor, cause the system to:
      create a data manager associated with an application based on application context, the data manager defining execution logic that manages a data processing flow, the application context providing configuration information of the application;
      retrieve a first set of models corresponding to a first service;
      dynamically create, by the data manager during a run-time of the application, a first API corresponding to the first service, the first API including a first set of callable methods based on rules specified in the first set of models;
      receive, from the first service, a first request to perform a specific task by calling the created first API; and
      execute the first request to perform the specific task by executing a method selected from among the first set of callable methods in the first API, wherein executing the method in the first API includes:
         resolving, by using the first set of models, information needed for executing the method based on the first request;
         executing, by the data manager in communication with the first set of models, the method using the resolved information; and
         returning, by the data manager, a result of performing the specific task to the first service.

2. The system of claim 1, wherein the memory further stores executable instructions that, when executed by the processor, further cause the system to:
   retrieve a second set of models corresponding to a second service; and
   dynamically create, by the data manager during the run-time of the application, a second API corresponding to the second service, the second API including a second set of callable methods based on rules specified in the second set of models, wherein the second API corresponding to the second service is different from the first API corresponding to the first service.

3. The system of claim 1, wherein:
   the application context includes at least code components, data, flags, or other arbitrary context to the application,
   the first set of models include a list of specifications, and
   the specifications describe network requests and define the rules and policies matching the execution logic of the data manager.

4. The system of claim 1, wherein the data manager, the first set of models, and the first service are agnostic of data and logic of each other, and the data manager and models hide low-level instructions composing and execution from the first service.

5. The system of claim 1, wherein the memory further stores executable instructions that, when executed by the processor, further cause the system to share the first API with other services.

6. The system of claim 1, wherein the memory further stores executable instructions that, when executed by the processor, further cause the system to:
   receive a second request from the first service to create the first API; and
   create, by the data manager, the first API in response to receiving the second request.

7. The system of claim 1, wherein the result includes either an indication that the specific task is successfully performed or a failure message of performing the specific task.

8. The system of claim 1, wherein the memory further stores executable instructions that, when executed by the processor, further cause the system to:
   track execution of the APIs; and
   provide network health states by the data manager.

9. The system of claim 1, wherein the memory further stores executable instructions that, when executed by the processor, further cause the system to:
   pass the application context from the data manager to a data model set; and
   create the first set of models by the data model set using the application context.

10. The system of claim 1, wherein to execute, by the data manager in communication with the first set of models, the method, the memory further stores executable instructions that, when executed by the processor, further cause the system to:
    transform, by using the first set of models, an initial specification to a final specification based on the resolved information; and
    execute, by the data manager in communication with the first set of models, the method based on the final specification.

11. The system of claim 10, wherein to resolve, by using the first set of models, the information needed for executing the method based on the first request, the memory further stores executable instructions that, when executed by the processor, further cause the system to:
    transmit one or more parameters associated with the first request from the first service to the set of models;

identify a contractor service outside of the application from the application context; and determine the information needed to create the final specification using the contractor service based on the one or more parameters and the initial specification.

12. A method for facilitating data processing based on dynamically-created application programming interfaces (APIs), the method comprising:

creating a data manager associated with an application based on application context, the data manager defining execution logic that manages a data processing flow, the application context providing configuration information of the application;

retrieving a first set of models corresponding to a first service;

dynamically creating, by the data manager during a run-time of the application, a first API corresponding to the first service, the first API including a first set of callable methods based on rules specified in the first set of models;

receiving, from the first service, a first request to perform a specific task by calling the created first API; and executing the first request to perform the specific task by executing a method selected from among the first set of callable methods in the first API, wherein executing the method in the first API includes:

resolving, by using the first set of models, information needed for executing the method based on the first request;

executing, by the data manager in communication with the first set of models, the method using the resolved information; and returning, by the data manager, a result of performing the specific task to the first service.

13. The method of claim 12, further comprising:

retrieving a second set of models corresponding to a second service; and dynamically creating, by the data manager during the run-time of the application, a second API corresponding to the second service, the second API including a second set of callable methods based on rules specified in the second set of models, wherein the second API corresponding to the second service is different from the first API corresponding to the first service.

14. The method of claim 12, wherein:

the application context includes at least code components, data, flags, or other arbitrary context to the application, the first set of models include a list of specifications, and the specifications describe network requests and define the rules and policies matching the execution logic of the data manager.

15. The method of claim 12, wherein the data manager, the first set of models, and the first service are agnostic of data and logic of each other, and the data manager and models hide low-level instructions composing and execution from the first service.

16. The method of claim 12, further comprising sharing the first API with other services.

17. The method of claim 12, further comprising:

receiving a second request from the first service to create the first API; and creating, by the data manager, the first API in response to receiving the second request.

18. The method of claim 12, further comprising:

tracking execution of the APIs; and providing network health states by the data manager.

19. The method of claim 12, wherein to execute, by the data manager in communication with the first set of models, the method, the method further comprises:

transforming, by using the first set of models, an initial specification to a final specification based on the resolved information; and executing, by the data manager in communication with the first set of models, the method based on the final specification.

20. The method of claim 19, wherein to resolve, by using the first set of models, the information needed for executing the method based on the first request, the method further comprises:

transmitting one or more parameters associated with the first request from the first service to the first set of models;

identifying a contractor service outside of the application from the application context; and determining the information needed to create the final specification using the contractor service based on the one or more parameters and the initial specification.

* * * * *